Figure 2:
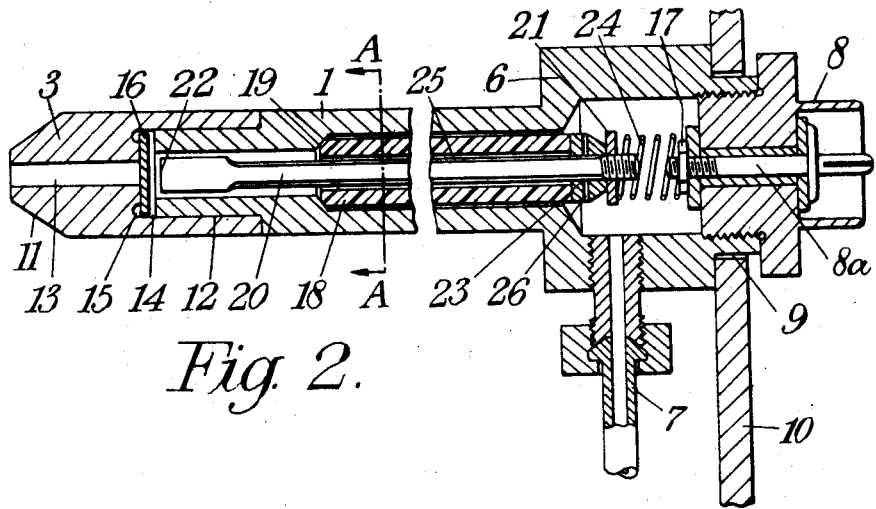

Oct. 27, 1953   W. P. MANSFIELD ET AL   2,656,722
BALANCED PRESSURE PICKUP
Filed Dec. 11, 1950

Inventors:
Wilfred Percival Mansfield and
Albert Henry Cornish
by Sugar & Purdy, Attorney Patented Oct. 27, 1953

2,656,722

UNITED STATES PATENT OFFICE 2,656,722

BALANCED PRESSURE PICKUP

Wilfred Percival Mansfield and Albert Henry Cornish, Slough, England, assignors, by mesne assignments, to National Research Development Corporation, London, England Application December 11, 1950, Serial No. 200,291
In Great Britain December 14, 1949

5 Claims. (Cl. 73—398)

1

This invention relates to pressure indicators and recorders of the kind having a pick-up with a disc or diaphragm which is moved against an applied pressure by the pressure to be indicated so that movement of the disc or diaphragm occurs when the pressure being indicated substantially equals the applied pressure. The movements of said disc or diaphragm cause electrical changes in an associated circuit so that the time when pressure equalisation occurs can be indicated and/or recorded. In this way, instantaneous pressures or a cycle of pressure changes in the apparatus to which the pick-up is attached may be indicated and/or recorded; in the latter case, by varying the value of the applied pressure through the range to be indicated, a series of points throughout the cycle are obtained.

Known indicators and recorders of the kind referred to fall into two main classes, those having pick-ups in which the disc or diaphragm is fitted with or forms part of an electric contactor which comes into contact with or is separated from a coacting contactor fitted to the body of the device when the applied pressure is reached and in which the contactors are connected in an electric circuit to operate an indicating and/or recording device, and those having pick-ups in which the disc or diaphragm is situated in a magnetic field such that upon movement of the disc or diaphragm electric currents are caused to be generated or modified in an adjacent circuit thus causing indications and records of the time when the pressure in the apparatus to which the pick-up is fitted is substantially equal to the applied pressure.

Each of these known arrangements has its disadvantages as well as advantages, firstly, in the contactor type of pick-up, the contacts soon become coated with carbon or other deposits, resulting in erratic operation, or if maintained clean they tend to become welded together by the current passing. Secondly, with the electromagnetic pick-up, owing to its size it is necessary to mount the latter at the end of a small diameter passage leading from the inside of the apparatus being tested to the pick-up outside, which passage is frequently of considerable length and results in spurious readings due to time delay and wave effects in the passage.

The object of the present invention is to provide an improved pressure indicating and recording device which will be accurate and reliable in use and which will overcome the disadvantages above referred to.

The invention consists in a pick-up for use

2 in a balanced pressure type pressure indicator or recorder comprising an electrically conducting tubular body one end of which is adapted to be placed in communication with a chamber containing the fluid the pressure of which is to be indicated or recorded, a pair of oppositely positioned spaced abutments in the bore of said body spaced apart longitudinally of the same, an electrically conducting plate positioned between said abutments, part at least of said plate being substantially free to move longitudinally of the bore in the body to contact alternatively the said abutments owing to the change from the greater pressure being on one side of the plate to the greater pressure being on the other side thereof, a fixed electrode adjacent one of the abutments and electrically insulated from the plate, means to afford electrical connection with the body and the electrode and means to afford fluid connection with the side of the plate remote from the end of the body adapted to be placed in communication with the pressure fluid.

Figure 1:
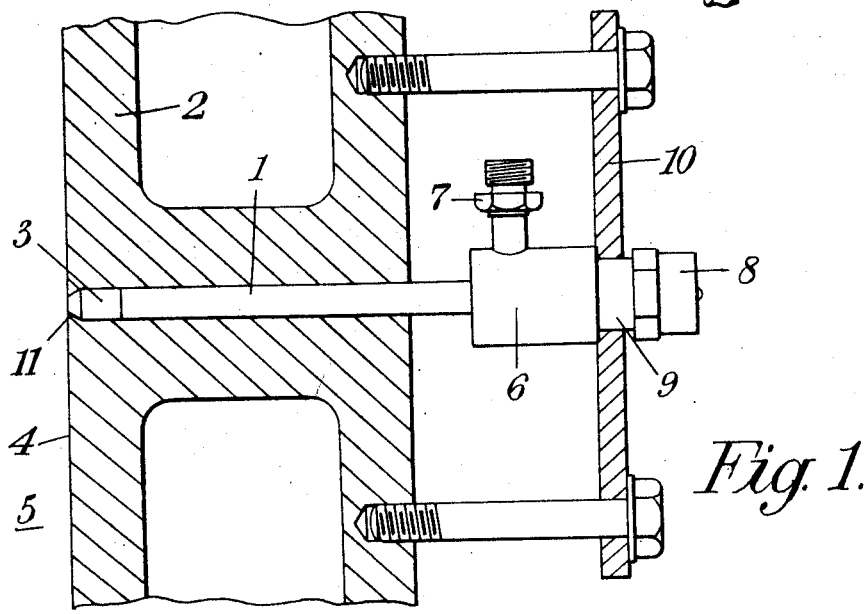
Figure 3:
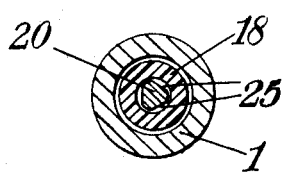

The accompanying drawings show, by way of example only, one embodiment of the invention in which:

Figure 1 is an elevation of the pick-up shown in position in the apparatus being tested, Figure 2 is a longitudinal section of the pick-up, Figure 3 is a cross section of the pick-up on the line A—A of Figure 2.

In the preferred embodiment of the invention the pick-up comprises a small tubular stem portion 1 for insertion into a corresponding bore provided in the machine 2 to be tested such that the end cap portion 3 approaches the internal surface 4 of the wall of the space 5, the fluid pressure within which is to be indicated or recorded. The outer portion 6 of the pick-up is of a larger diameter so as to be capable of accommodating the connector 7 for the application of the substantially constant fluid pressure and the connector 8 for the electrical connections to the device. The outer portion 6 is provided with an annular groove 9 for engagement, for example, by a slotted plate 10 for holding the stem portion of the pick-up in intimate contact with the end 11 of the bore in the machine to be tested.

The stem portion 1 and the outer portion 6 are preferably made in one piece. The stem may for example be of ¼" external diameter or even smaller so that difficulty is not experienced in finding a suitable location in the machine for the bore of the same.

The end of the main part of the stem is reduced in its external diameter 12 to receive a cap 3 which is correspondingly counter-bored. The cap is provided with a small axial hole 13 leading from the counter-bore to the end thereof. The depth of the counter-bore in the cap is a little greater than the length of the reduced part 12 of the end of the main part of the stem portion so that when the cap is in position a space 14 is left between the end of the inner portion and the bottom of the counter-bore in the cap. The face at the bottom of the counter-bore is carefully ground flat in a plane at right angles to the axis of the bores and is also provided with a small annular groove 15 adjacent the circumferential wall of the cap, this face forms the seating for the small metal disc 16 which is of lesser diameter than the bore in the cap and thus is free to move longitudinally of the bore, to one extreme position where it lies against the seating in the cap and in the other extreme position where it lies across the end of the main part of the stem portion.

The outer end of the outer portion is screw threaded internally to receive the connector 8, the inner member 8a of which passes through the plug in an insulated bore terminated in an insulated washer inside and outside; the inner member being screw threaded to receive a nut 17 on the inner end thereof, to hold the same tightly axial with the plug.

The bore of the stem portion is provided with a heat resisting electrically insulated sleeve 18 of a material such as that known as "Vitreosil" one end of which abuts a bevelled shoulder 19 adjacent the inner end of the same and the other end projects a short distance into the bore of the outer portion. A rod like electrode 20 is positioned within this insulating sleeve, one end being screw threaded to receive a nut 21 while the other 22 is ground in a plane at right angles to its axis. The ground end of the electrode approaches level with the inner end of the inner portion but does not quite contact the disc when it takes bearing upon the tube. The other end of the electrode carries a bush 23 which bears at one end on the outer end of the insulating sleeve and the other upon the nut on the rod. The whole assembly of electrode, bush and sleeve are held in position by a helical spring 24 bearing at one end on the outer side of the nut and at the other end upon the inner end of the inner member of the coaxial cable connector. Such a spring loaded arrangement allows of free expansion of the sleeve when heated. If more convenient the electrical connection to the outer portion of the pick-up may be made by way of the machine being tested and the stem, instead of or in addition to the connector.

Three flats 25 are provided throughout the greater length of the rod like electrode 20 which communicate with radial holes 26 in the bush so that a gas when introduced under pressure into the outer portion 6 can flow freely to the back of the disc in the cap. Alternatively a tubular electrode may be used. The inner end of the cap is preferably of conical shape externally so as to fit closely into the end of a bore drilled in the apparatus being tested. The cap 3 is held in position against the gaseous pressure by the pick-up, which in turn is held within the bore in the apparatus by a saddle member 10 engaging in an annular recess 9 in the outer portion 6.

In use the pick-up is inserted into a bore drilled in the apparatus being tested and the pressure applied to the back of the disc is raised or lowered as required. Each time the pressure in the apparatus rises above or falls below that of the applied fluid pressure the disc is moved in the appropriate direction, with consequent variation of the electrical capacity of the unit.

It is to be understood that the pick-up in accordance with the invention is not limited in its construction to that described in relation to the accompanying drawings.

The pick-up is adaptable for use in conjunction with a number of electrical circuits for supplying the necessary voltages and currents for operating indicating and recording apparatus, of which the following description gives a number of typical arrangements.

The pick-up may be used either as a means for changing the electrical potential in a circuit to which it is connected, or as a variable capacitor in a tuned circuit. A circuit in which an electrical potential is varied by changes in the capacity of the pick-up may be one in which the pick-up is connected across a resistor and a battery in series therewith. The change of capacity of the pick-up causes currents to flow through the resistor and battery resulting in the setting up of a fluctuating potential across the two. These fluctuations are passed by a series capacitor while the steady voltage from the battery is blocked. Such an input circuit can be connected to the input of an oscillograph whereby changes in capacity of the pick-up give corresponding deflections on the device. Amplification of the signal passed to the oscillograph is provided as necessary, depending on the sensitivity of the latter. Synchronisation of the oscilloscope with the engine or apparatus being tested is provided as required.

Alternatively, the input circuit may be connected to a drum or other recorder whereby a record is made upon a sheet of paper. In such an arrangement the output from the input circuit is connected by way of an amplifier to the drum recorder the shaft of which is extended for connection with the engine being tested so that they both rotate in synchronism. The degree of amplification necessary varies with the type of recording material being used i. e. by a modulating light source upon a photosensitive surface, by an electric current through an electro-sensitive chemically treated paper or by an electric spark penetrating a suitably prepared paper.

The pick-up can be connected in the tuned circuit so that it will change the resonant frequency of the same with change of capacity of the pick-up. Accordingly, an oscillator is provided, the output of which is fed to the indicator or recorder by way of a discriminating circuit, and if necessary an amplifier. The discriminating circuit is normally tuned to give minimum response and therefore a minimum voltage output from the circuit while the pick-up is so connected that change of capacity causes a change of output from the discriminating circuit. One way of achieving this is to connect the pick-up to the tuned circuit of the oscillator with the result that the frequency of the oscillator changes with changes of capacity of the pick-up, in other words, the oscillations are frequency modulated. Another way of achieving this is to connect the pick-up to the tuned circuits of the discriminator the frequency of the oscillations remaining constant. As the tuning of the discriminator circuits is varied the output of the said circuits also varies. An advantage of this arrangement is that the frequency of the oscillations remains unvaried and therefore can be controlled by a quartz crystal to ensure stability in the device.

The discriminator circuit can conveniently consist of a pair of tunable circuits tuned to opposite sides of the normal unmodulated signals from the oscillator so that as the frequency of the oscillations increases or decreases the voltage developed in either of the said circuits increases. This voltage is rectified in each case by a diode or other rectifier and the combination of the two outputs so obtained is passed to the following circuit. When it is required that the output from the diodes be modified to suit the particular type of recorder used, e. g. oscilloscope, a differentiating circuit may follow the discriminator circuit.

The variable capacity balanced pressure pick-up in accordance with the invention is not limited to the construction hereinbefore described but may be varied in the disposition and arrangement of the various parts and can be made of cross sectional shapes other than circular, for instance hexagonal, square, etc., as desired without departing from the scope of the invention. Likewise the pick-up is not limited in use to the arrangements hereinbefore described but can be used with other indicating and recording apparatus as desired and other details for carrying the invention into effect may be varied without departing from the scope of the invention.

We claim:

1. Pick-up for use in a balanced pressure type pressure indicator or recorder comprising an electrically conducting tubular body one end of which is adapted to be placed in communication with a chamber containing the fluid the pressure of which is to be indicated or recorded, a pair of oppositely positioned spaced abutments in the bore of said body spaced apart longitudinally of the same, an electrically conducting plate positioned between said abutments, part at least of said plate being substantially free to move longitudinally of the bore in the body to contact alternatively the said abutments owing to appropriate change of difference in fluid pressure on opposite sides of said plate, a fixed electrode adjacent one of the abutments and adapted to act with the plate to form the electrodes of a variable capacitor and electrically insulated from the plate and body, the change of position of the part at least of the said plate changing the electrical capacity between the body and the electrode, means to afford electrical connection with the body and the electrode and means to afford fluid connection with the side of the plate remote from the end of the body adapted to be placed in communication with the pressure fluid.

2. Pick-up as claimed in claim 1 in which the electrode is a rod-like member within the bore of said body, the plate being a disc unattached to said body while the abutments are shoulders formed by the change of size of the bore of the body.

3. Pick-up as claimed in claim 1 in which the electrode is a rod-like member within the bore of said body, the plate being a diaphragm supported around its periphery in said bore.

4. Pick-up as claimed in claim 1 in which the electrode is a rod-like member within the bore of said body and insulated therefrom by a concentric tube of insulating material, a passage being provided to allow of the passage of fluid longitudinally of the body to and from the face of the plate adjacent the electrode and the end of the body remote from the stem.

5. Pick-up for use in a balanced pressure type pressure indicator or recorder comprising an electrically conducting tubular body one end of which is in the form of a stem which is adapted to be inserted in a bore in the wall around a chamber containing fluid the pressure of which is to be indicated or recorded, oppositely positioned abutments in the bore of said body spaced apart longitudinally of the same, a disc of greater diameter than the bore in said abutments, of less diameter than the bore in the body and of less thickness than the space between the abutments positioned between the abutments, a rod-like electrode in the bore of said body to that side of the space between the abutments remote from the end of the stem communicating with the pressure fluid, one end of the electrode being close to the plane of the adjacent abutment, insulating means electrically insulating the electrode from the body, the electrode forming with the disc the electrodes of a variable capacitor, the change of position of the disc changing the capacity between the body of the device and the electrode, terminal means at the end of the body remote from the stem electrically connected to the body and the electrode, a passage longitudinally of the body to allow the passage of fluid to and from the face of the disc adjacent the electrode and fluid conduit connector means communicating with the passage at a point remote from the plate, the bore in the body being closed at the end remote from the stem.

WILFRED PERCIVAL MANSFIELD.
ALBERT HENRY CORNISH.

References Cited in the file of this patent

UNITED STATES PATENTS

| Number | Name | Date |
| --- | --- | --- |
| 1,956,403 | Scott | Apr. 24, 1934 |
| 2,238,234 | Stansfield | Apr. 15, 1944 |
| 2,355,088 | LaVoie | Aug. 8, 1944 |
| 2,367,866 | Humphreys et al. | Jan. 23, 1945 |
| 2,452,799 | Speaker et al. | Nov. 2, 1948 |